United States Patent [19]
Hermsen et al.

[11] Patent Number: 5,509,099
[45] Date of Patent: Apr. 16, 1996

[54] OPTICAL FIBER CLOSURE WITH SEALED CABLE ENTRY PORTS

[75] Inventors: Eric J. Hermsen, Howell; Wayne L. Peterson, Milltown; Stanley Krawiec, Manalapan, all of N.J.

[73] Assignee: Antec Corp., Rolling Meadows, Ill.

[21] Appl. No.: 430,215

[22] Filed: Apr. 26, 1995

[51] Int. Cl.⁶ ..................................................... G02B 6/00
[52] U.S. Cl. .......................... 385/134; 385/135; 385/137
[58] Field of Search ................................... 385/134–137, 385/94; 174/48, 49, 50, 50.5

[56] References Cited

U.S. PATENT DOCUMENTS

| | | | |
|---|---|---|---|
| 5,313,546 | 5/1994 | Toffetti | 385/135 |
| 5,375,185 | 12/1994 | Hermsen et al. | 385/135 |
| 5,434,945 | 7/1995 | Burek et al. | 385/135 |
| 5,440,666 | 8/1995 | Burek et al. | 385/135 |

Primary Examiner—John D. Lee
Assistant Examiner—Phan T. H. Palmer
Attorney, Agent, or Firm—R. Gale Rhodes, Jr.

[57] ABSTRACT

Optical fiber closure including a pair of mating surfaces one of which is provided with a groove having a first volume and a deformable sealing member mounted in and extending outwardly from the groove with the groove having a volume larger than the volume of the sealing member; upon the mating surfaces being forced together, the sealing member is compressed and deforms within the groove and provides a substantially fluid-tight seal between the surfaces. The closure may include a plurality of cable clamps provided with outwardly extending deformable sealing members which are received in grooves having a larger volume than the volume of the sealing members whereby upon the cable clamps being forced into engagement with optical fiber cables entering or exiting the closure the sealing members are received in the grooves and compressed and deformed within the grooves to provide a fluid-tight seal between the cable clamps and optical fiber cables entering or exiting the closure. Closure apparatus also may include a plurality of individual cable clamps each provided with individual sealing means and with each cable clamp being capable of being disengaged from a fiber optical cable without interrupting the sealing engagement between the other cable clamps and other optical fiber cables.

19 Claims, 13 Drawing Sheets

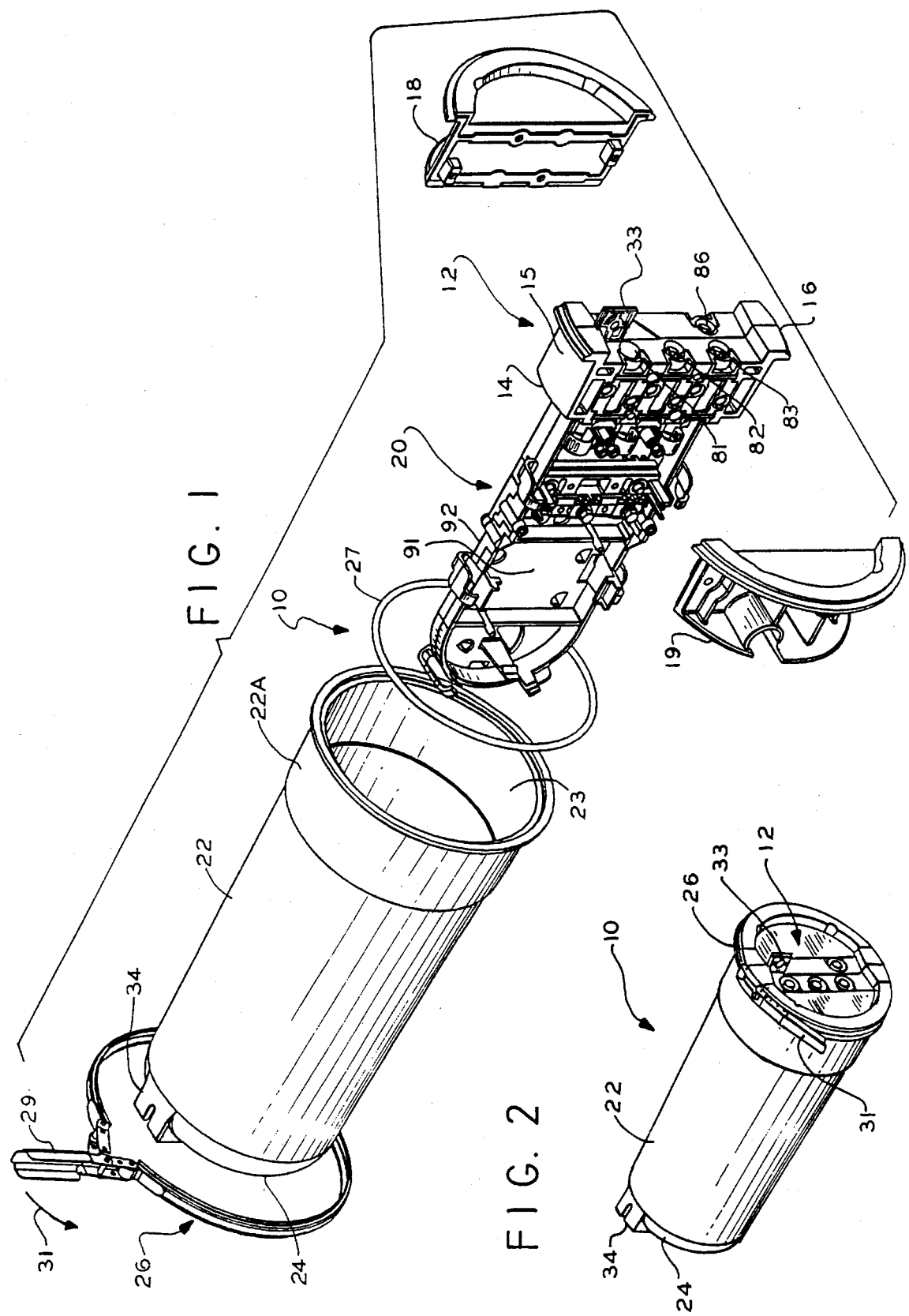

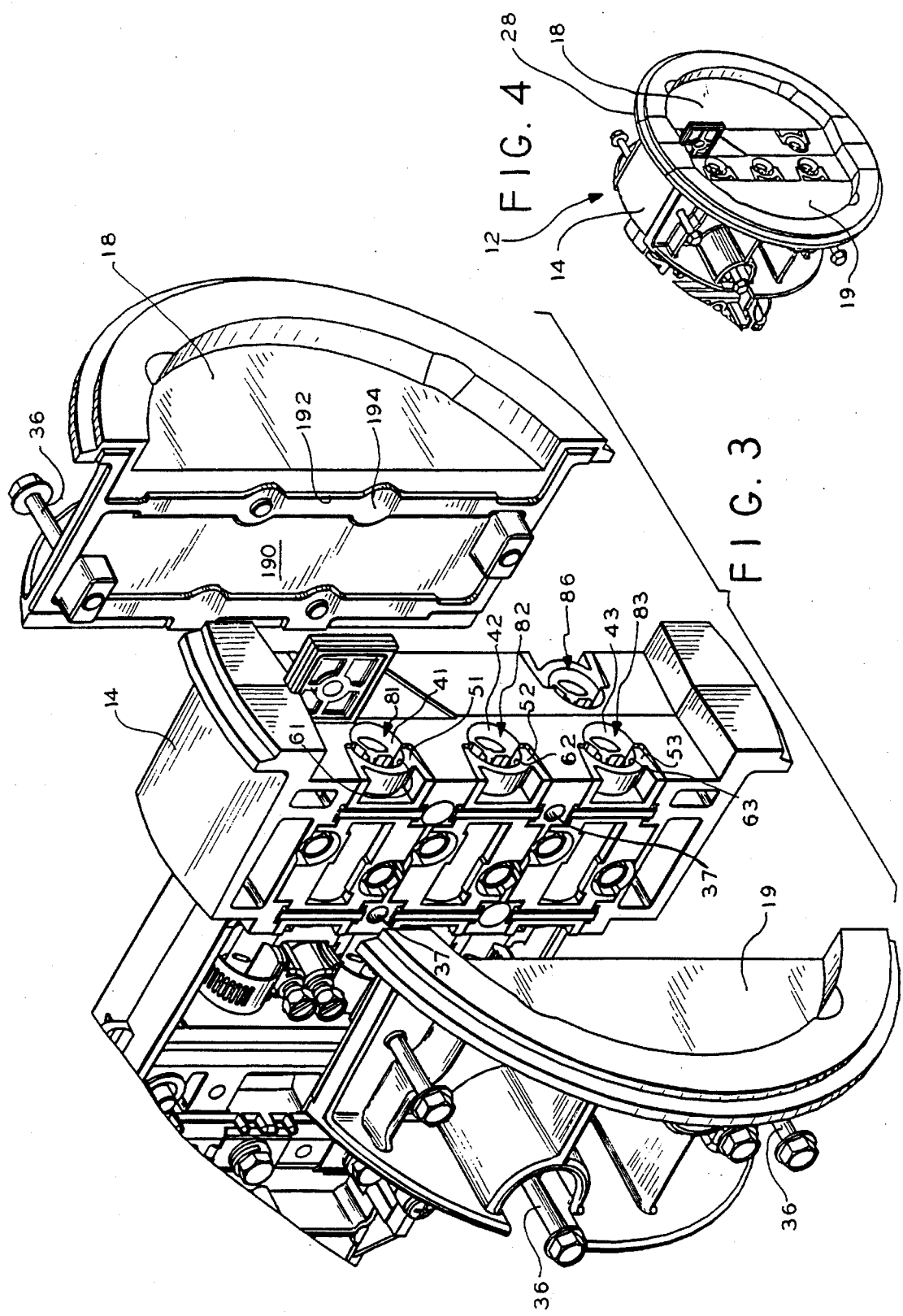

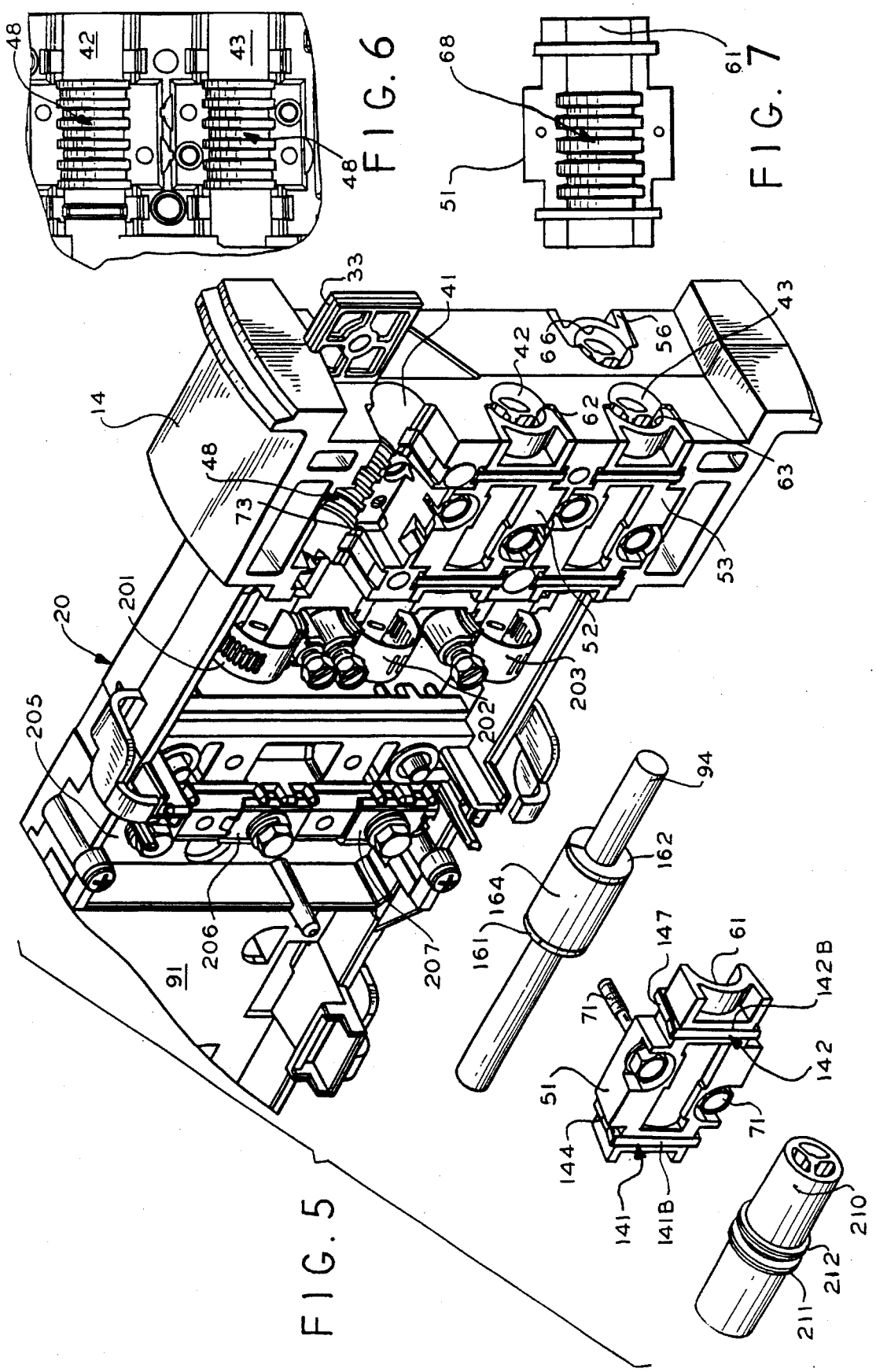

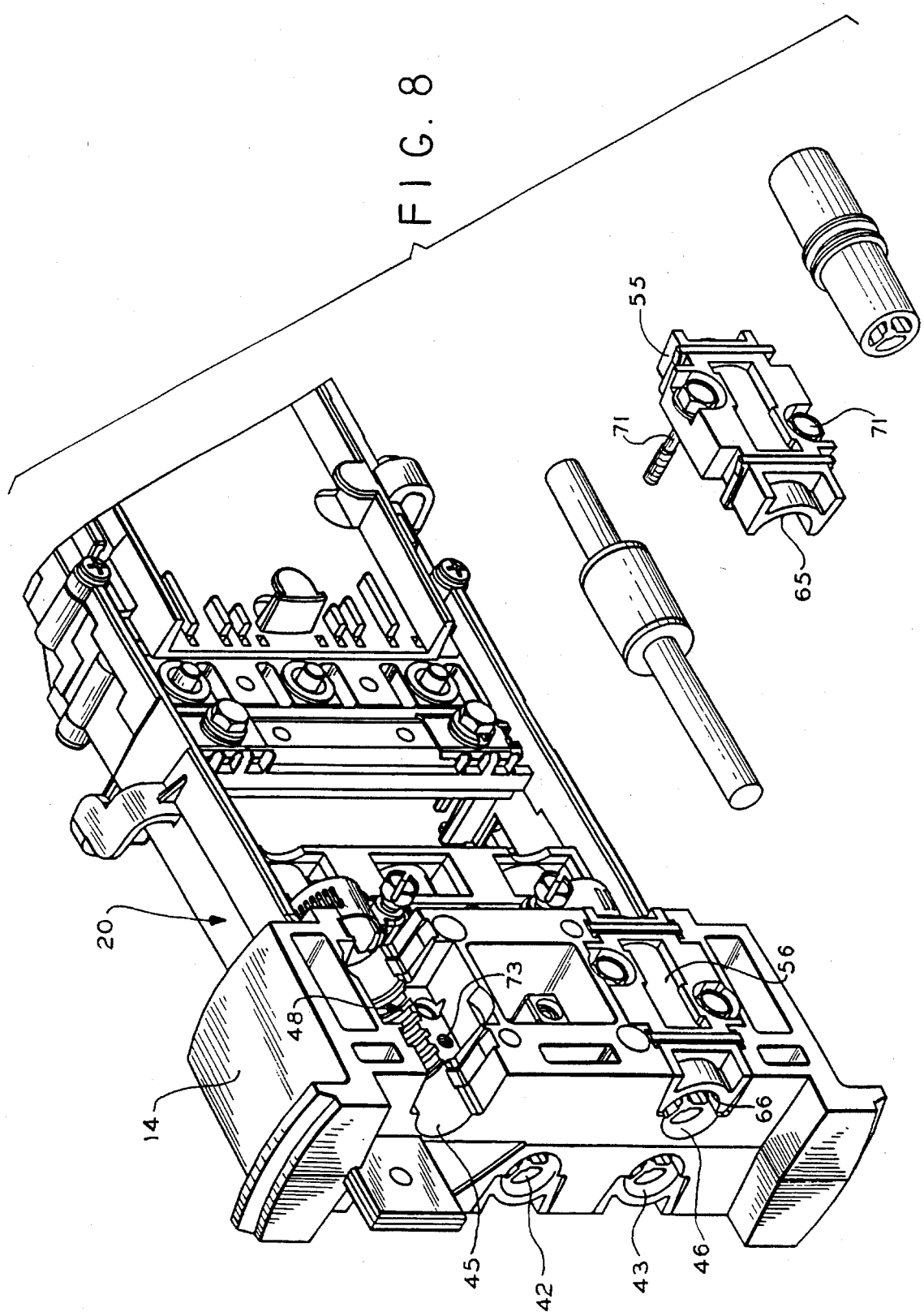

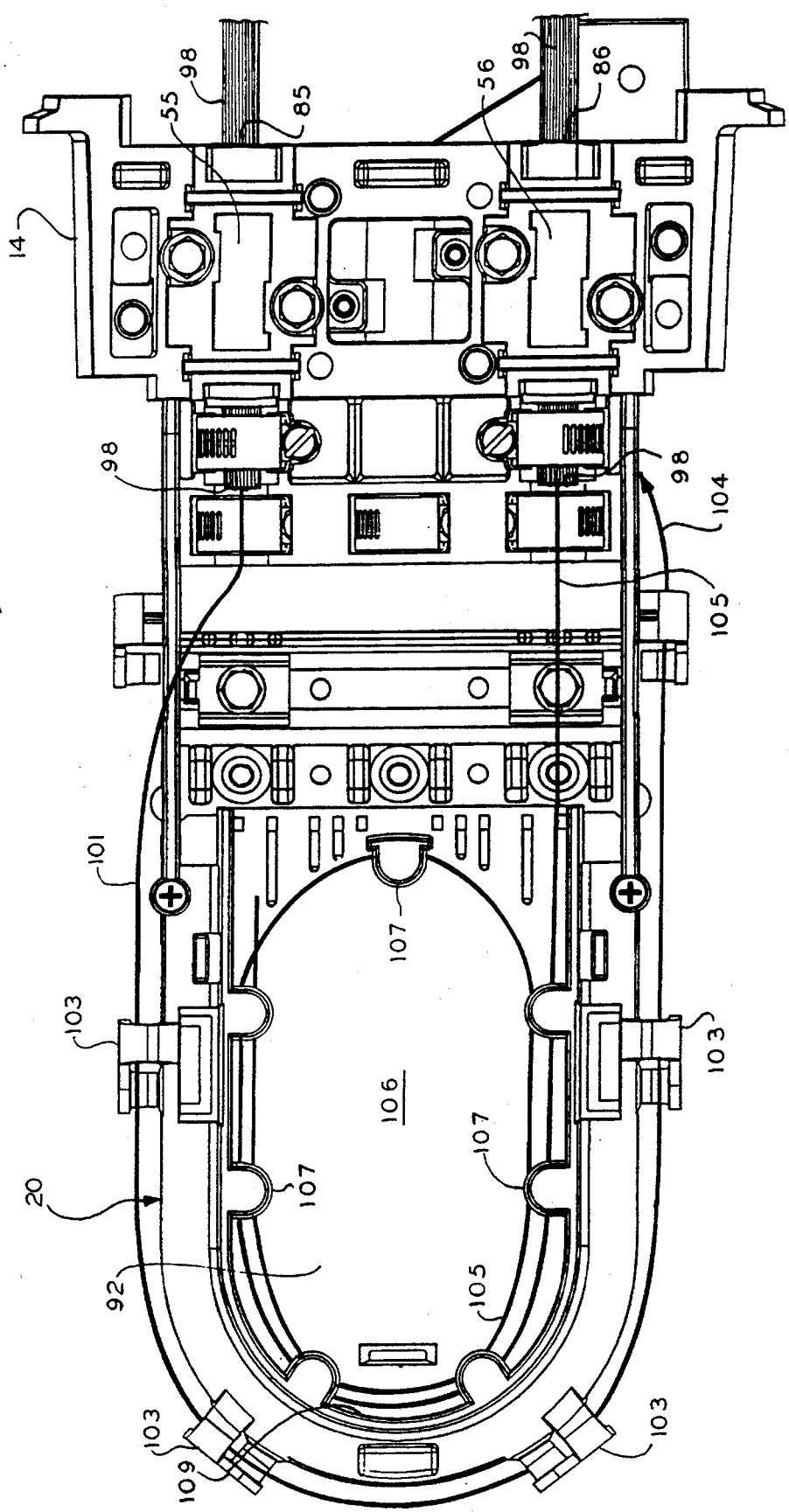

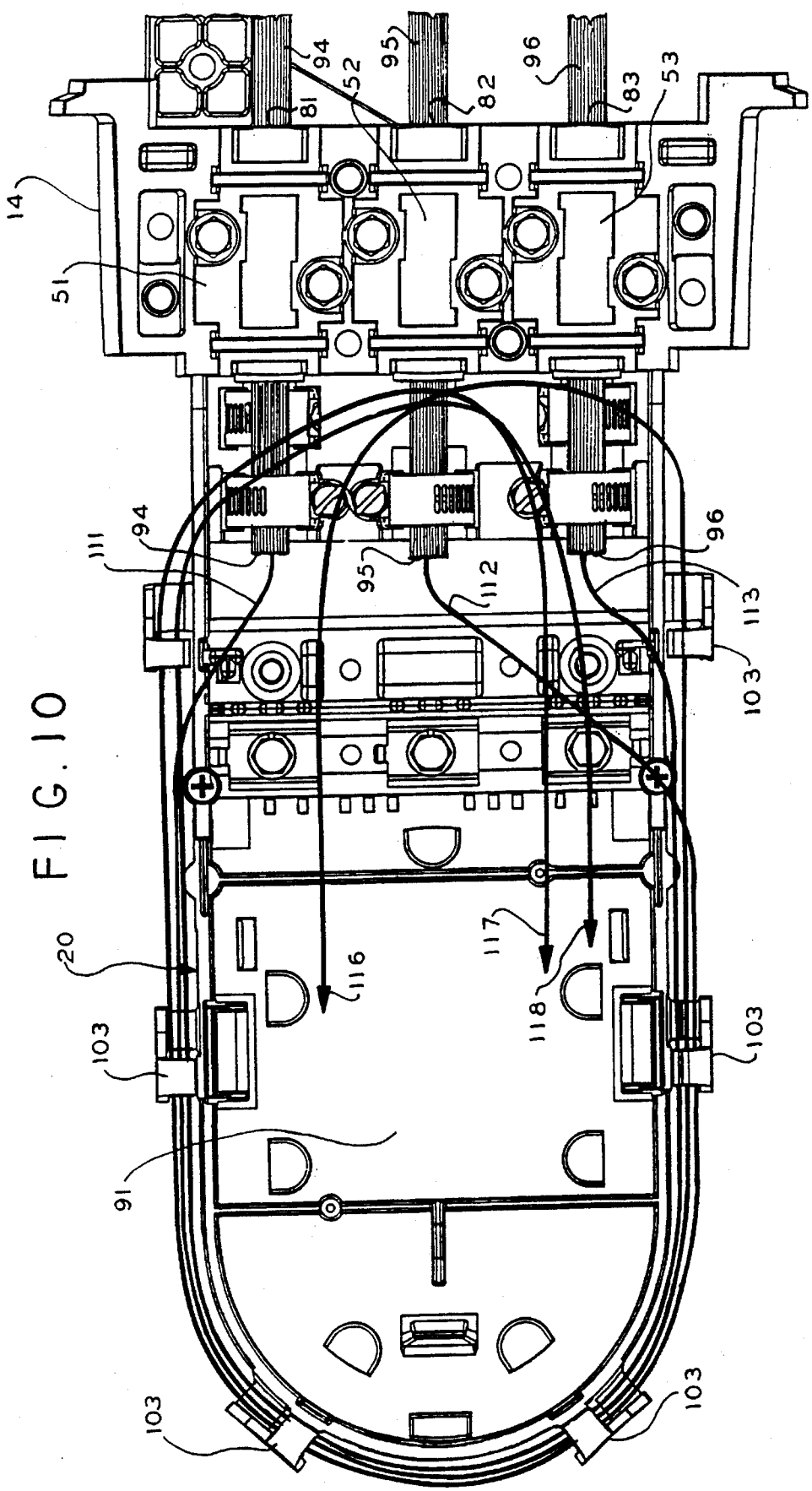

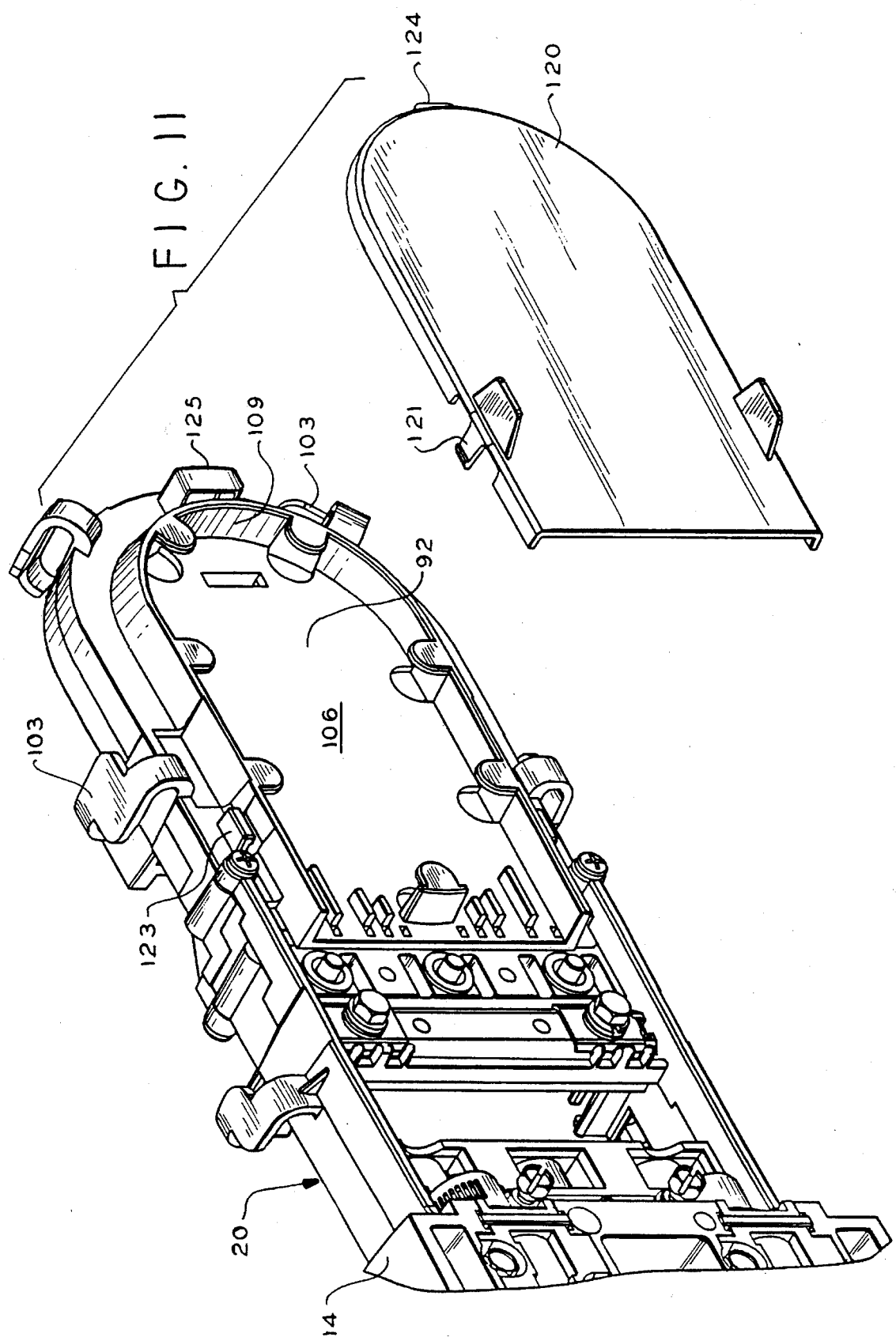

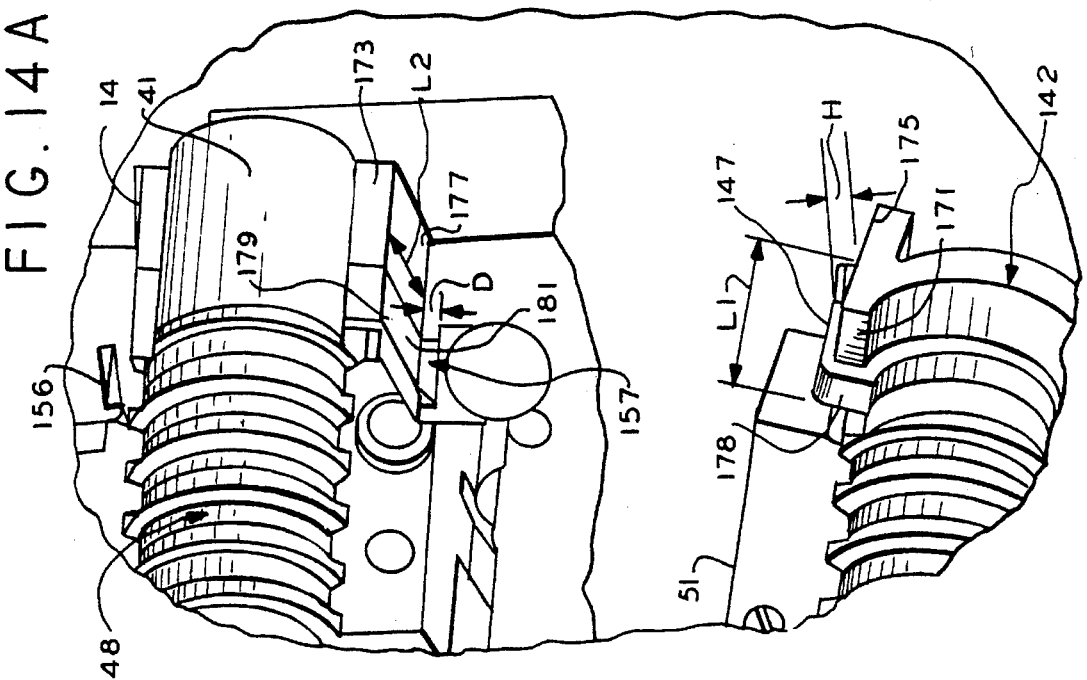
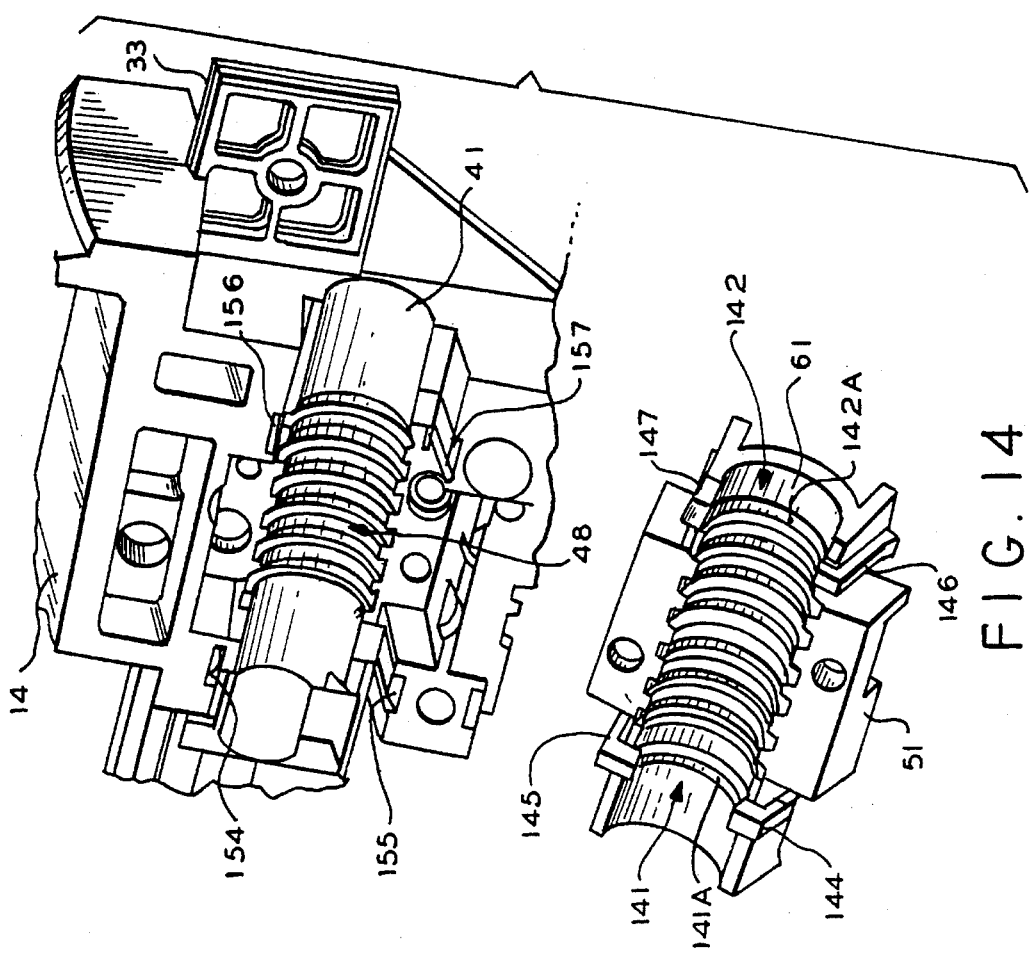

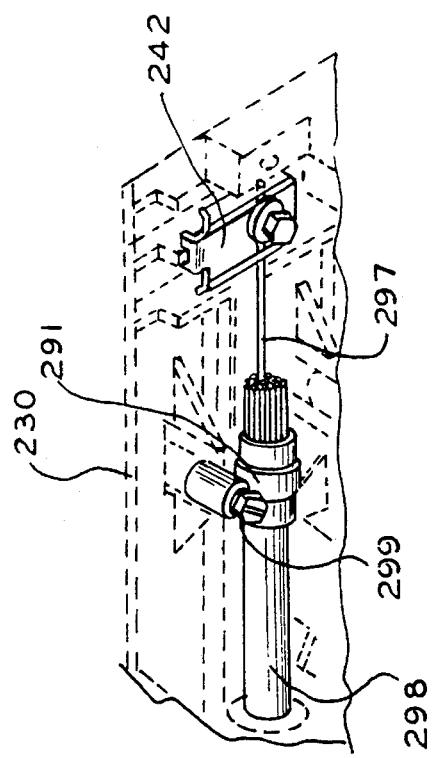
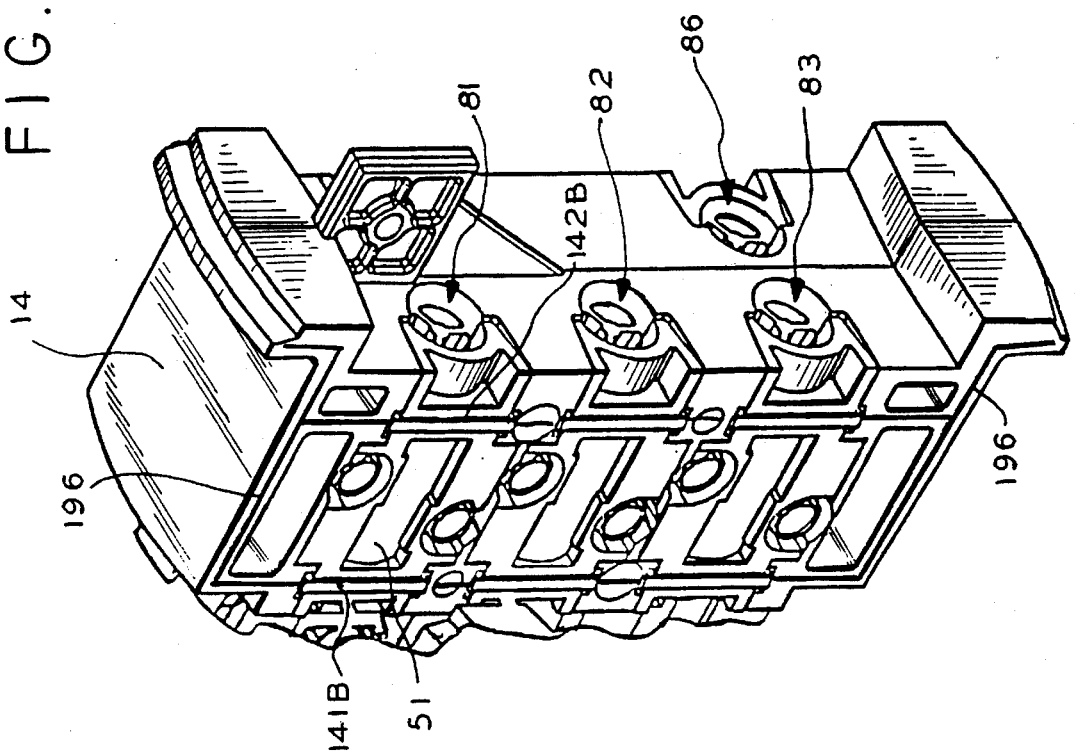

5,509,099

OPTICAL FIBER CLOSURE WITH SEALED CABLE ENTRY PORTS

BACKGROUND OF THE INVENTION

This invention relates generally to an optical fiber closure, or enclosure, for receiving and storing splices between optical fibers, and more particularly relates to an optical fiber closure for receiving and storing splices between optical fibers of an optical fiber cable referred to in the art as a through or express optical fiber cable and the optical fibers of one or more optical fiber cables referred to in the art as a drop or stub optical fiber cable.

Numerous optical fiber closures are known to the art for receiving and storing splices between optical fibers. However, there still exists a need in the art for a new and improved optical fiber closure providing improved sealing between optical fiber cables entering and exiting the closure and improved sealing between the components or elements comprising the closure.

Further, there exists a need in the art for a new and improved optical fiber closure which permits a workman to work on a single optical fiber cable entering or exiting the closure without interrupting the seal between other optical fiber cables entering and exiting the closure.

SUMMARY OF THE INVENTION

It is the object of the present invention to satisfy the foregoing needs in the optical fiber closure art.

An optical fiber closure satisfying the foregoing needs in the art and embodying the present invention may include a closure having at least a pair of mating surfaces one of which is provided with a groove having a first volume and a deformable sealing member mounted in the groove with the sealing member having a volume larger than the volume of the groove. Upon the mating surfaces being forced together, the sealing member deforms and sealingly engages the other of the surfaces and provides a substantially fluid-tight seal between the surfaces. Closure apparatus also embodying the present invention may include a plurality of cable clamps provided with outwardly extending deformable sealing members which are received in grooves having a smaller volume than the volume of the sealing members whereby upon the cable clamps being forced into engagement with optical fiber cables entering or exiting the closure the sealing members are received in the grooves and deformed to provide a fluid-tight seal between the cable clamps and optical fiber cables entering or exiting the closure. Further, closure apparatus embodying the present invention may include a plurality of individual cable clamps each provided with individual sealing means and with each cable clamp being capable of being disengaged from a fiber optical cable without interrupting the sealing engagement between the other cable clamps and other optical fiber cables.

DESCRIPTION OF THE DRAWINGS

FIG. 1 is an exploded view in perspective of a first embodiment of optical fiber closure apparatus of the present invention;

FIG. 2 shows the elements comprising the closure apparatus shown in FIG. 1 in their assembled condition;

FIG. 3 is an exploded view in perspective of the base of the closure;

FIG. 4 shows an assembly of the base elements shown in FIG. 3;

FIG. 5 is an exploded view, in perspective, of the base center section, a portion of the frame support, a cable clamp, a cable port plug and a partial view of an optical fiber cable to be sealed;

FIG. 6 is a front elevational view of a portion of the base central section of FIG. 5 illustrating a pair of semi-circular grooves and internal grooves transverse thereto;

FIG. 7 is an elevational view of the interior of a representative cable clamp;

FIG. 8 is a view similar to FIG. 5 but showing the opposite side of the structure shown in FIG. 5;

FIG. 9 is an elevational view of one side of the frame support and central base member of the closure shown in FIG. 1;

FIG. 10 is a view of the side opposite to that shown in FIG. 9;

FIG. 11 is a perspective view of a portion of the central base section, the frame and a separate cover for an optical fiber compartment provided on the frame;

FIG. 14 is a perspective view illustrating in detail the structure of a representative cable clamp and the structure of a semi-circular groove provided in the central section of the base;

FIG. 14A is an enlarged view of a portion of FIG. 14 showing in detail the structure of a representative sealing member provided on a cable clamp and a representative sealing member receiving groove provided on the central base section;

FIG. 17 is a partial perspective view of the base central section illustrating diagrammatically the mating surface provided on one side of the base central section;

FIG. 19 is a diagrammatical view illustrating the function of the hose clamps and central strength member clamps of the closure of the present invention.

DESCRIPTION OF THE PREFERRED EMBODIMENT

Figure 12:
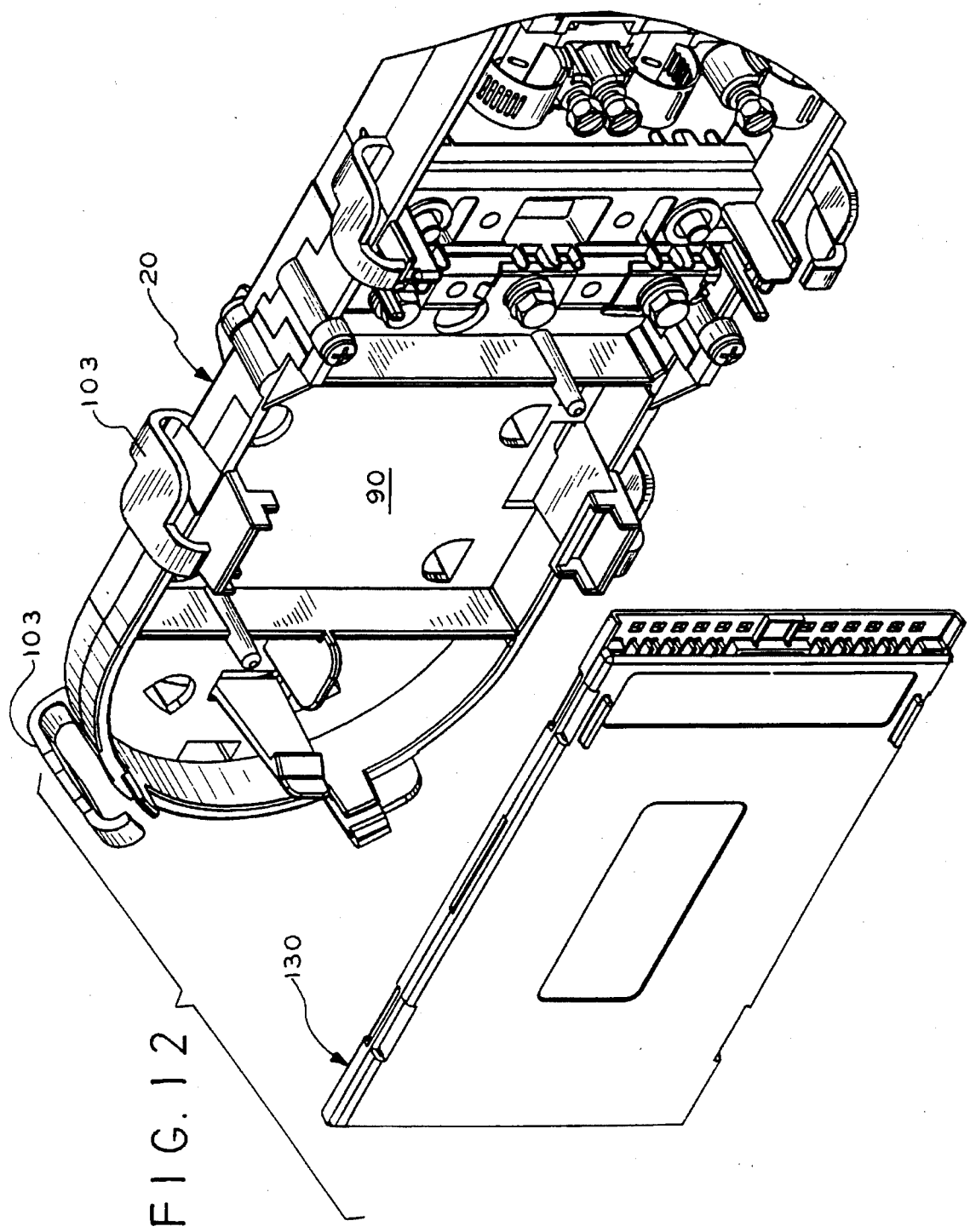
FIG. 12 is a perspective view of an optical fiber splice tray, the frame and a portion of the central base section.

Referring now to FIG. 1, there is illustrated a first embodiment of optical fiber closure apparatus of the present invention which is indicated by general numerical designation 10. It will be generally understood that in the preferred embodiment closure 10 is for receiving and storing splices between optical fibers of an express or through optical fiber cable and the optical fibers of one or more drop or stub optical fiber cables. Closure 10 includes a cylindrical base indicated by general numerical designation 12 and which base includes a central or center section 14 including opposed cylindrical portions 15 and 16 and a pair of side or lateral generally semi-cylindrical sections 18 and 19. The side sections 18 and 19 may be assembled to and disassembled from the central section 14 and upon being assembled the central and side sections comprise the cylindrical base 12 shown in FIG. 4 and which base 12 is provided with a peripheral flange 28.

The closure 10, FIG. 1, further includes a frame or support frame indicated by general numerical designation 20, extending outwardly from the base 12. The base 12 and frame 20 may be formed integrally or may be formed separately and suitably joined together.

Further, the closure 10, FIG. 1, includes a generally cylindrical cover 22 having an open end 23 and a closed or domed end 24 opposite the open end 23. A cover clamp 26 and an O-ring 27 also are included; the cover clamp 26 includes a pivotable lever 29 for contracting or closing and locking the clamp. At least the peripheral cover portion 22A, surrounding the open end 23, is slightly flexible. For assembly, FIG. 1, the base 12 is first assembled as shown in FIG. 4, the O-ring 27 is moved rightwardly as viewed in FIG. 1 to reside against the inner portion of the flange 28, the cover is placed or slid first over the frame 20 and then over the base 12 after which the cover clamp 26 is moved rightwardly and placed around the flange 28 and the clamp lever 29 is rotated counterclockwise as indicated by the arrow 31 in FIG. 1 to clamp the lower peripheral portion 22A of the cover 22 against the O-ring 27 and base 12 to provide a fluid tight seal between the base 12 and cover 22. The assembled optical fiber closure 10 is shown in FIG. 2. The optical fiber closure apparatus 10 may be supported aerially on a metal strand by the support members 33 and 34 provided at opposite ends of the closure 10; the structure of support member 33 may be better seen in FIG. 3.

The assembly of the base side sections 18 and 19 to the base central section 14 may be better understood by reference to FIG. 3. The outer or side sections 18 and 19 are provided with a plurality of bolts 36 extending slidably therethrough; the ends of the bolts 36 are threadedly received in internally threaded holes 37 provided in the central section 14 of the base 12 to assemble the outer sections to the central section.

Referring now to FIG. 5, the central section 14 of the base 12 is provided on the side shown in FIG. 5 with a plurality of inwardly extending semi-circular grooves 41, 42 and 43, and on the other side, note FIG. 8, with a plurality of inwardly extending semi-circular grooves 45 and 46; only groove 41 is shown in FIG. 5 and only groove 45 is shown in FIG. 8. The grooves 41–43 and 45 and 46 may also be provided with a plurality of transversely and inwardly extending grooves indicated by general numerical designation 48 in FIGS. 5, 6 and 8.

Optical fiber closure 10 further includes a first plurality of optical fiber cable clamps 51, 52 and 53, FIG. 5, and a second plurality of optical fiber cable clamps 55 and 56, FIG. 8. In FIG. 5, cable clamp 51 is shown dismounted from the base center section 14 and the clamps 52 and 53 are shown mounted to the center section, and in FIG. 8, the clamp 55 is shown dismounted from the base center section 14 and the clamp 56 is shown mounted to the base center section. It will be generally understood that each of the optical fiber cable clamps is provided with an inwardly extending generally semi-circular groove; cable clamps 51, 52 and 53 shown in FIG. 5 are provided with semi-circular grooves 61, 62 and 63 and cable clamps 55 and 56 shown in FIG. 8 are provided with semi-circular grooves 65 and 66. Similar to the semi-circular grooves 41–43 and 45 and 46 formed in the central section 14, the semi-circular grooves formed in the cable clamps are also provided with a plurality of transverse grooves indicated by general numerical designation 68 as may be better understood by reference to representative cable clamp 51 shown in FIG. 7.

It will be generally understood that the cable clamps are mounted individually to the base center section 14 opposite the pluralities of semi-circular grooves formed in the center section. For example, and referring to clamp 51 shown in FIG. 5, clamp 51 is provided with threaded bolts 71 extending slidably therethrough and the threaded ends of such bolts are received in internally threaded holes formed in the base center section 14 such as internally threaded hole 73 shown in FIG. 5. Upon the cable clamps 51, 52 and 53 being mounted to the center section 14, the semi-circular grooves 61 62 and 63 provided in these clamps oppose the semi-circular grooves 41, 42 and 43 formed in the base center section 14 and these opposed semi-circular grooves cooperatively provide a first plurality of optical fiber cable ports, 81, 82 and 83, FIG. 3, through which drop or stub optical fiber cables enter the closure 10. Similarly, upon the cable clamps 55 and 56, FIG. 8, being mounted to the center section 14, the semi-circular grooves 65 and 66 provided in these clamps oppose the semi-circular grooves 45 and 46 provided in the base center section 14, and these opposed semi-circular grooves cooperatively provide a second plurality of optical fiber cable ports 85 and 86 (only port 86 being shown in FIG. 3) through which an express or through optical fiber cable enters and exits the closure 10. As may be best understood by reference to FIG. 3, these pluralities of cable ports are disposed in two parallel rows or columns, with the first plurality of cable ports 81, 82 and 83 being arranged or disposed on the leftward side of the base central section 14 and with the second plurality of cable ports 85 and 86 being arranged or disposed on the rightward side of the base center section 14.

The frame or frame support 20 is flat, or substantially flat, as will be noted from various of the figures, in particular FIG. 1. As will be understood from FIG. 1, the frame 20 includes a first side 91 and a second or opposite side 92. Side 92 is not shown in FIG. 1, but it will be understood to be opposite side 91; side 92 is shown in detail in FIG. 9 and side 91 is shown in detail in FIG. 10. Accordingly, it will be noted from FIGS. 1 and 9 that the row of cable entry ports 81 and 82 and 83 are disposed parallel to the frame side 91 and it will be understood that cable entry ports 81, 82 and 83, FIG. 10, permit the entry of drop or stub optical fiber cables 94, 95, 96 into the closure 10. Similarly, it will be noted from FIGS. 1 and 10 that the cable ports 85 and 86 are disposed parallel to the frame side 92 and it will be understood that the cable ports 85 and 86 permit the entry and exit of an express or through cable 98 into and out of the closure 10. Referring again to FIG. 9, it will be understood that in the manner known to the art the outer portions of the express or through cable 98 are cut away to expose one or more internal optical fibers as indicated by representative optical fibers 101 and 105 in FIG. 9. It will be noted that the frame 20 is provided on the exterior with a plurality of routing clips 103 for routing the optical fibers, e.g. fiber 101 around the edge of the frame and around the frame to the other side 91 of the frame (FIG. 10) as indicated by the arrow 104 in FIG. 9. Representative optical fiber 105 of the through or express cable 98, FIG. 9, is received and stored in a compartment 106 provided on the frame side 92; compartment 106 may be better seen in FIG. 11. It will be noted from FIG. 9 that the frame 20 may be provided with a plurality of inwardly extending tabs 107 for maintaining the optical fibers, e.g. optical fiber 105, stored in the compartment 106. It will be further understood that the radius of the curved portion 109 providing in part the compartment 106 is provided with a radius of curvature at least equal to, or slightly greater than, the minimum bending radius of optical fibers; the curved portion 109 is better seen in perspective in FIG. 11.

Referring again to FIG. 10, it will be understood that the exterior portion of the leftward ends of the stub or drop optical fiber cables 94, 95 and 96 are cut away in the manner known to the art to expose the internal optical fibers, e.g. representative optical fibers 111, 112 and 113, which optical fibers may be routed around the frame 20 through the routing clips 103 until their respective ends, indicated by the arrows 116, 117 and 118 reside on the side 91 of the frame 20 as shown in FIG. 10. As noted above generally the closure 10 of the present invention is for storing or housing splices between the optical fibers of the through or express cable 98, FIG. 9, and the optical fibers of the drop or stub cables 94, 95 and 96 shown in FIG. 10.

The compartment 106 provided on the side 92 of the frame 20 may be better understood by reference to FIG. 11, and from which figure it will be understood that the apparatus 10 of the present invention may further include a cover 120 which may be snap fitted to the frame 20 by a pair of detent or snap members, only snap member 121 of such pair of snap members is shown in FIG. 11. The snap members are resilient to permit them to be snap fitted to the frame 20, e.g. the detent or snap member 121 is received or snap fitted under the cover mounting member 123 provided on the frame 20; also the end of the cover 120 is provided with a tab 124 which is inserted under a protrusion 125 provided on the end of the frame 20.

Figure 13:
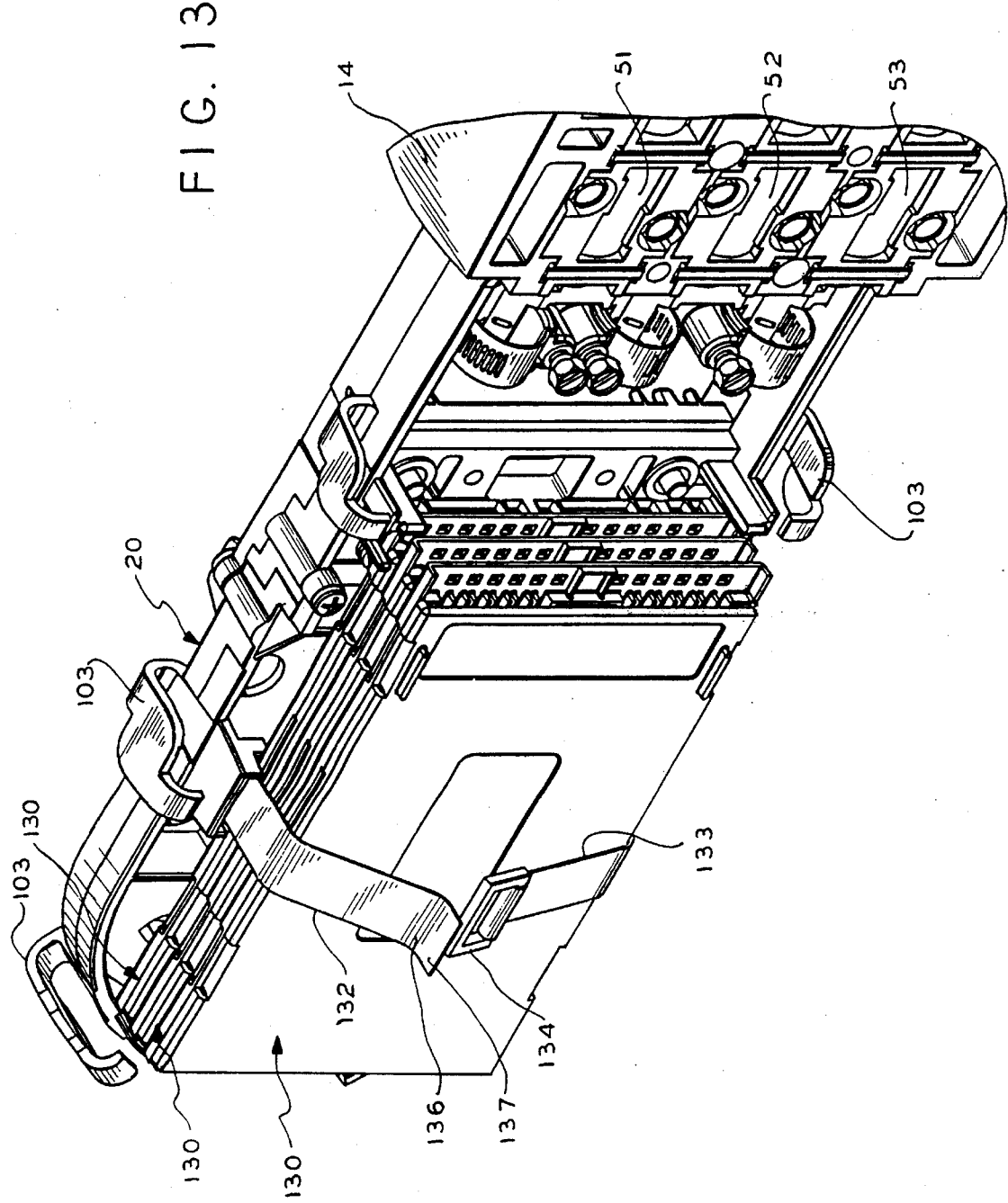
FIG. 13 is a view similar to FIG. 12 but showing a plurality of optical fiber splice trays mounted to the frame of the optical fiber closure.

Referring to FIGS. 12 and 13, the closure apparatus 10 of the present invention may further include a plurality of optical fiber splice trays each indicated by general numerical designation 130 and which splice trays may be, for example, the optical fiber splice tray disclosed in U.S. Pat. No. 5,375,185, entitled APPARATUS FOR STORING AND ORGANIZING SPLICED OPTICAL FIBERS, Eric J. Hermsen et al. inventors, and which patent is assigned to the same assignee as the present invention; this patent is hereby incorporated herein by reference as if fully reproduced herein. It will be understood that an optical fiber such as representative optical fiber 101 from the express or through cable 98, FIG. 9, is fed or routed around the frame 20 as indicated by the arrow 104 in FIG. 9, and is routed or fed into the interior of an optical fiber splice tray, such as tray 130 shown in FIG. 12, and that an optical fiber, such as optical fiber 111 from the drop or stub cable 94, FIG. 10, is also fed or routed into the optical fiber splice tray and splices between two such fibers are made in the manner known to the art and are organized and stored in the tray 130 as illustrated in the U.S. Pat. No. 5,375,185 patent incorporated herein by reference. Referring to FIG. 13, it will be understood that the frame 20 may be provided with a strap having ends 132 and 133 for mounting the trays 130 to the frame 20. The strap end 133 is provided with a loop 134 through which the strap end 132 is looped and the strap end 132 is provided with suitable hook and eye fastener portions 136 and 137 which may be fastened together to mount the plurality of the optical fiber splice trays 130 to the frame 20.

Figure 14B:
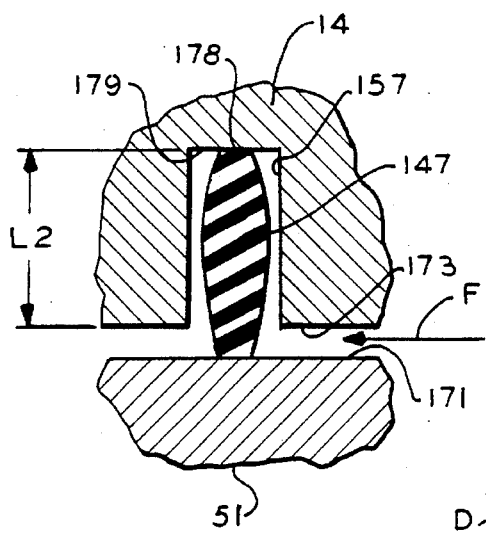
FIG. 14B is a diagrammatical cross-sectional view taken generally horizontally with respect to FIG. 14 and looking downwardly; this view illustrates diagrammatically the manner in which a portion of the sealing member provided on a cable clamp is compressed to provide a fluid-tight seal between two mating surfaces.
Figure 14C:
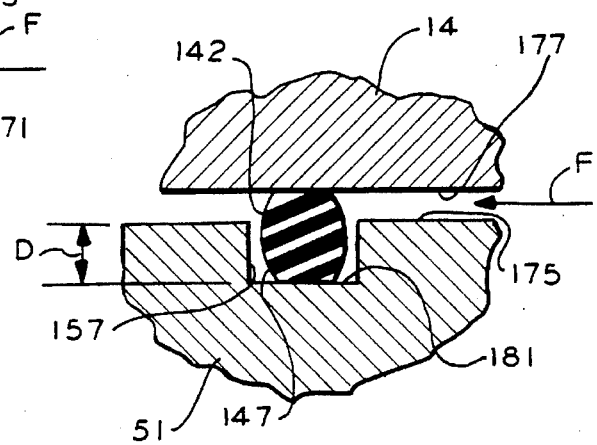
FIG. 14C is a cross-sectional diagrammatical illustration taken generally vertically with respect to FIG. 14 and illustrating the compression of a portion of a sealing member provided on a cable clamp to provide a fluid-tight seal between mating surfaces.

Reference is now made to the sealing aspects or features of the present invention. The sealing feature provided by the cable clamps and grooves of the present invention will be described with regard to representative cable clamp 51, FIGS. 5 and 14, and with regard to representative semi-circular groove 41; it will be understood that the other cable clamps and semi-circular grooves provide the same sealing feature. Cable clamp 51 is provided with a pair of outwardly extending, deformable sealing members indicated by general numerical designations 141 and 142. Sealing members 141 and 142 are provided, respectively, with pairs of top and bottom portions 144 and 145 and 146 and 147 as may be best understood by reference to FIG. 14. The central base section 14, FIG. 14, is provided with pairs of inwardly extending grooves 154 and 155 and 156 and 157 adjacent the ends of the semi-circular groove 41. The grooves 154 and 155 and 156 and 157 have a greater volume than the volumes of the top and bottom portions 144 and 145 and 146 and 147 of the sealing members 141 and 142 provided on the cable clamp 51. Also, it will be understood that the grooves 154 and 155 and 156 and 157 are generally complementary in shape to, and are for receiving, the top and bottom portions of the sealing members 141 and 142 upon the cable clamp 51 being mounted to the base central section 14 as described above by the threaded bolts 71, FIG. 5. It will be further understood, note FIG. 14A, with regard to representative bottom sealing member 142 and representative inwardly extending groove indicated by general numerical designation 157, the length L1 of the sealing member bottom portion 147 is greater than the length L2 of the groove 157 and that the height H of the sealing member bottom portion 147 is greater than the depth D of the groove 157. It will be still further understood that upon the sealing member bottom portion 147 being forced into the groove 157 upon the cable clamp 51 being mounted to the base center section 14 as described above, the face 171 provided on the cable clamp 51 engages and mates with the face 173 provided on the base center section 14 and the face 175 provided on the cable clamp 51 mates with the surface 177 provided on the cable central section 14. It will be generally understood since the length L1 of the sealing member portion 147 is greater than the length L2 of the groove 157, and since the height H of the sealing member portion 147 is greater than the depth D of the groove 157, the end 178 of the sealing member 147 sealingly engages the end portion 179 of the groove 157 and the sealing member 147 is compressed inwardly longitudinally and deforms into or bulges outwardly within the groove 157 which is permitted since the volume of the groove is greater than the volume of the sealing member 147. This is illustrated diagrammatically in FIG. 14B where it will be noted that the end 178 of the bottom sealing member portion 147 has sealingly engaged the end 179 of the groove 157 and the sealing member is compressed longitudinally inwardly and deforms into or bulges outwardly in the groove 157; the sealing engagement between the end of the sealing member bottom portion 178 and the end of the groove 179 provides a fluid-tight seal and prevents the entry of fluid indicated by arrow F in FIG. 14B to enter the closure 10 (FIG. 1) between the mating surfaces 171 and 173. Similarly, as illustrated diagrammatically in FIG. 14C, upon the bottom portion 147 of the sealing member 142 being forced into engagement with the bottom 181 of the groove 157, the sealing member bottom portion 147 is compressed longitudinally inwardly and deforms into or bulges outwardly in the groove 157, which is permitted by the volume of the groove 157 being greater than the volume of the sealing member bottom portion 147, and the bottom of the sealing member 147 sealingly engages the bottom 181 of the groove 157 to provide a fluid-tight seal between the mating surfaces 175 of the cable clamp 51 and the surface 177 of the central base section 14 to prevent the entry of fluid indicated by arrow F in FIG. 14C into the closure 10, FIG. 1, between the mating surfaces 175 and 177. It will be understood that the sealing members provided on the other cable clamps provide the same fluid-tight seals between associated mating surfaces and associated grooves in which such sealing members are received.

Referring further to FIG. 5, the provision of a fluid-tight seal around a representative optical fiber cable, e.g. representative stub or drop optical fiber 94 will be presented. The closure apparatus 10 of the present invention may further include a pair of split rings or annular members 161 and 162 which may be placed over or around the cable 94 and spaced apart to provide a spool-type portion for receiving a wrapping of suitable sealing tape 164 which may be, for example, the B sealing tape known to the art. Upon the cable 94 being wrapped with the sealing tape 164, a portion of the cable 94 wrapped by the sealing tape 164 is inserted in the groove 41 provided in the base central section 14 and the rings 161 and 162 are received or seated in a pair of the grooves 48 provided in the semi-circular groove 41. The cable clamp 51 is then placed over the cable 94 with a portion of the sealing tape 164 being received in the semi-circular groove 61 and the rings 161 and 162 are seated in a pair of the grooves 68 (FIG. 7) provided in the semi-circular groove 61. It will be understood that the inner semi-circular portions 141A and 142A (FIG. 14) of the sealing members 141 and 142 will be compressed and will sealingly engage the cable 94 upon the cable clamp 51 being mounted to the base central section 14 by the threaded bolts 71 (FIG. 5) as noted above; such sealing engagement prevents the entry of fluid into the enclosure between the cable and the semi-circular portions of the sealing members.

It will be further understood that since each of the cable clamps 51–53 and 55 and 56 are mounted individually to the base section 14, whereby a workman desiring to work, for example, only on the stub cable 94, merely unfastens the threaded bolts 71, FIG. 5, and removes only the cable clamp 51 and in doing so does not disturb any of the fluid-tight seals between the other cable clamps and the other optical fiber cables.

Figure 15:
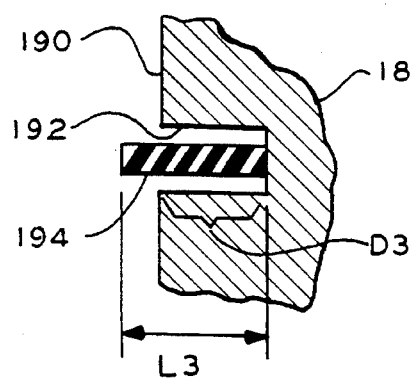
FIGS. 15 and 16 are diagrammatical illustrations illustrating sealing around the cable clamps.
Figure 16:
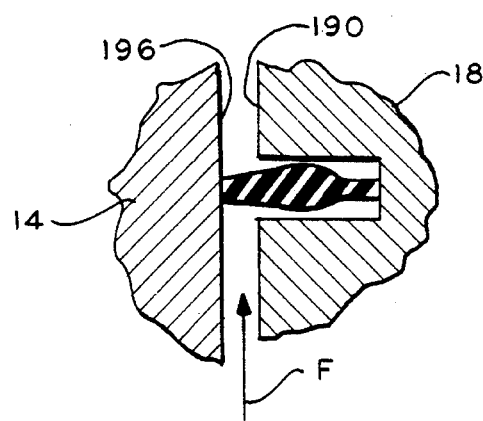

Referring now to the second sealing feature or aspect of the present invention, it will be generally understood, and referring particularly to FIG. 3, that the generally semi-circular side sections 18 and 19 comprising the base 12, FIG. 4, are provided with outwardly extending deformable sealing members which provide a fluid-tight seal around the cable clamps, particularly the exterior portions of the cable clamps, upon the side sections 18 and 19 being mounted to the base central section 14 by the threaded bolts 36, as described above, to prevent the entry of fluid into the closure 10 between the side sections 18 and 19 and the cable clamps particularly the exterior portions of the cable clamps. The face 190 of the side section 18, FIG. 3, is provided with an inwardly extending groove 192 in which an outwardly extending deformable sealing member 194 is mounted as may be better seen by reference to FIG. 15. Face 190, and more particularly the portions of the face 190 immediately surrounding the groove 192 and sealing member 194 provide a mating surface which mates with a correspondingly shaped mating surface provided on the base center section 14, such mating surface formed on the base center section 14 is not shown in FIG. 3 but will be understood to be opposite the outer section face 190. The mating face provided on the base center section 14 opposite the mating face (not shown in FIG. 3) provided on the outer section 19 is illustrated in FIG. 17 and indicated generally by the line 196. It will be noted that the mating face illustrated by the line 196 includes not only portions of the surface of the side of base section 14, shown in detail in FIG. 3, but also includes the outer or rearward portions of the sealing members provided on the cable clamps, such as the rearward portions 141B and 142B of sealing members 141 and 142 provided on representative cable clamp 51 shown in FIG. 5 and identified in FIG. 18. It will be understood that the volume of grooves 192 is greater than the volume of the sealing members 194, note FIG. 15, and that the length L3 of the sealing members 194 is greater than the depth D3 of the grooves 192 whereby upon the outer sections 18 and 19 being assembled and mounted to the center section 14 of the base 12, the outwardly extending deformable sealing members 194, note representative sealing member 194 shown in FIG. 16, sealingly engage the mating faces on the base center section 14 (note mating face indicated by line 196 in FIG. 17) and are compressed longitudinally inwardly and deform into or bulge outwardly in the groove to form a fluid-tight seal between the mating faces formed on the base center section 14 and the mating faces formed on the outer sections 18 and 19 and prevent the entry of fluid indicated by the arrow F into the closure 10; this is illustrated diagrammatically in FIG. 16.

Referring again particularly to FIG. 5, it will be understood that the closure apparatus 10 of the present invention may further include a plurality of hose clamps mounted to the opposite sides of the frame 20 as illustrated by the hose clamps 201, 202 and 203. These hose clamps are for surrounding and tightly engaging the ends of the optical fiber cables extending through the cable ports and into the closure 10 to mount the optical fiber cables securely to the frame 20 and provide strain relief for optical fibers extending outwardly from the cables which are to be spliced as noted above; the function of the hose clamps is described in connection with a further embodiment of the invention described below.

Further, both sides of the frame 20 are provided with a plurality of central strength member clamps for tightly engaging central strength members which may be included in the optical fiber cables to provide further strain relief. Central strength member clamps 205, 206 and 207 are shown on side 91 of the frame 20 in FIG. 5; the function of these clamps is illustrated in FIG. 10 as described below in connection with a further embodiment of this invention.

Closure apparatus 10 of the present invention may further include a plurality of cable port plugs for plugging unused cable ports particularly unused cable ports of the first plurality of cable ports 81–83 for the stub or drop optical fiber cables. Representative cable port plug 210 is shown in FIG. 5, and it will be understood that the cable plugs are made of a suitable compressible resilient material to permit them to be engaged and clamped between a cable clamp and the base section 14 in the same manner as the optical fiber cables are clamped as described above to provide fluid-tight seals between the cable plugs and the base section 14 to prevent the entry of fluid into the closure 10 through an unused cable port. It will be noted that representative cable port plug 210 may be provided with outwardly extending circular ribs 211 and 212 which may be received within the transverse grooves 68 formed in the cable clamps (note FIG. 7) and the transverse grooves 48 (note FIG. 6) formed in the semi-circular grooves provided in the base center section 14.

Figure 18:
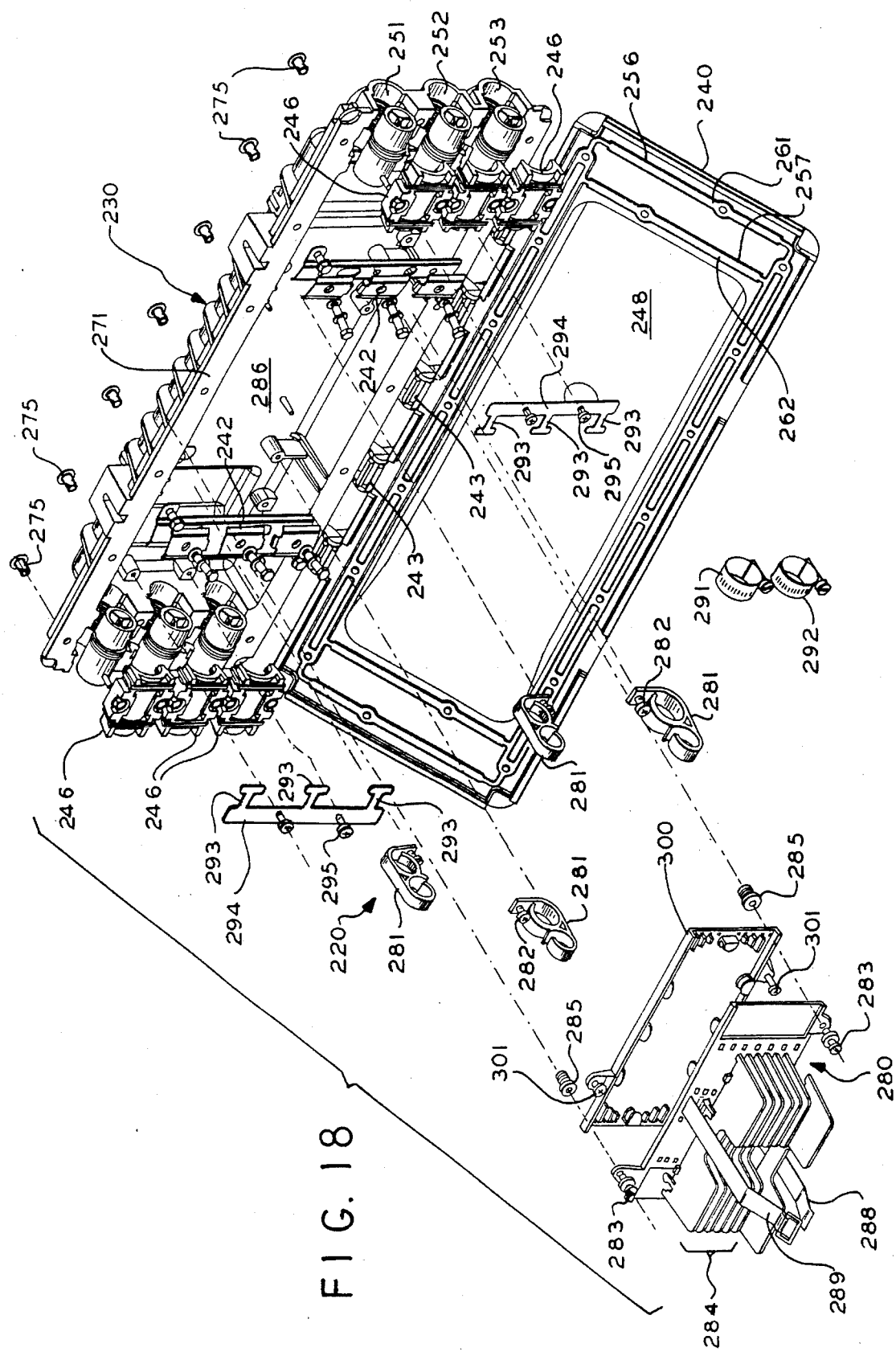
FIG. 18 is an exploded view in perspective of an alternate optical fiber closure apparatus embodying the present invention.

Referring now to FIG. 18, an alternate embodiment of optical fiber closure apparatus of the present invention is illustrated and indicated by general numerical designation 220. Closure 220 includes a base indicated by general numerical designation 230, and a cover indicated by general numerical designation 240 mounted pivotally to the bottom portion of the cover 230 by suitable hinges, e.g. 242 and 243. It will be generally understood that closure 220 functions in substantially the same manner as the closure 10 described above and also receives and houses splices between optical fibers of optical fiber cables. Closure 220 includes a plurality of cable clamps 246 which have the same structure and provide the same function as the cable clamps 51–53 and 56 and 55 described above. Base 230 is provided with a plurality of semi-circular grooves which in combination with the semi-circular grooves formed in the cable clamps provide two pluralities of cable ports into the base 230, or closure 240, with the cable ports provided in the rightward end of the base 230 as shown in FIG. 20 being identified by numerical designations 251, 252 and 253. It will be understood that a similar plurality of cable ports is provided at the opposite or leftward end of the base 230 but which are not shown in FIG. 20.

It will be noted that the inner surface 248 of the cover 240 is provided with grooves 256 and 257 for receiving deformable outwardly extending sealing members 261 and 262, and it will be understood that the volumes of the grooves 256 and 257 are greater than the volumes of the sealing members 261 and 262 and that the length of the sealing members is greater than the depth of the grooves. It will be further understood that these grooves and sealing members perform the same function as the grooves 192 and sealing members 194 provided on the face 190 of the outer base sections 18 and 19 described above and shown in FIG. 3; namely they provide a fluid-tight seal between the cover 240 and the cable clamp 246 and prevent the entry of fluid into the closure 220 between the cover and cable clamps.

It will be understood that an express or through cable may enter a cable port at the leftward end of the closure 220 and exit a cable port at the rightward end of the closure and that stub or drop cables may enter the closure through the cable ports provided at either of the ends of the closure 220.

It will be further understood that the cable clamps 246 of the closure 220 are provided with individual mounting means, or threaded bolts extending therethrough such as the threaded bolts shown 71 shown in FIG. 5, for mounting the cable clamps 246 individually to the base 230 to permit each cable clamp to be removed and the cable that it has been clamping worked on without interrupting the seals between the other cable clamps and the other optical fiber cables in which the other clamps are in sealing engagement. Closure 220 may be also provided with a plurality of routing clips 281 for receiving and routing optical fibers internally of the closure 220 particularly within the optical fiber storage compartment 286 formed in the base 230; the routing clips are suitably mounted to the base 230 by threaded members such as threaded members 282.

Similar to the closure 10 described above, closure 220 may include a plurality of hose clamps, hose clamps 291 and 292 being shown in FIG. 18, for engaging and securing optical fiber cables to the base 230 and providing the above-noted strain relief. In this embodiment, the hose clamps 291 and 292 are mounted on members 293 provided on support members 294 which are suitably mounted to the base 230 by threaded members 295.

Closure 220 may further include an optical fiber tray 300 which may be mounted in the base compartment 286 by threaded members 301. Tray 300 receives and stores optical fibers, such as optical fibers between the above-noted express or through cable. Further, the closure 220 may include optical fiber splice tray storage apparatus indicated by general numerical designation 280 which may include a tray support 280 on which are mounted a plurality of dividers 284 between which a plurality of optical fiber splice trays, such as trays 130 shown in FIGS. 12 and 13 may be retained and fastened thereon by a strap having ends 288 and 289 which strap ends function in the same manner as the strap ends 131 and 133 shown in FIG. 13 and described above to retain a plurality of splice trays on the support 280. The optical fiber splice tray stored between the dividers 284 store and organize splices between the optical fiber cables as described above with regard to the splice trays 130. Optical fiber splice tray storage apparatus 280 may be suitably mounted to the base 230 by suitable quarter turns 283 which are inserted into quarter turn inserts 285 which are mounted to the base 230 such as by ultrasonic welding.

Closure 220 may be provided with a plurality of optical fiber central strength member clamps 242 for engaging and clamping central strength members of the optical fiber cables entering the closure 220 to the base 230 to provide the above-noted strain relief. An example of such central strength member clamping is illustrated in FIG. 19 with regard to representative central strength member clamp 242 shown clamping the central strength member 297 of the representative optical fiber cable 298. Also shown in FIG. 19 is a representative hose clamp 291 shown clamping the cable 298 to the base 230 which clamping is produced by tightening of the threaded nut 299 in the manner known in the art.

The base outer or side sections 18 and 19, and the cable clamps may be suitably injection molded from a suitable material such as, for example, PC/PCTG-Polyester/Polycarbonate Blend available from Eastman Chemical Company, Kingsport, Tenn., under the trademark EKTAR® DA105; the base 230 and cover 240 of the closure 220 also may be injection molded from the material. The base center section 14 and frame 20 of closure 10 may be suitably injection molded integrally and may be made from, for example, PBT 30% glass filled polyester available under the trade designation E-16677B from Comalloy International, Brentwood, Tenn. The deformable sealing members extending outwardly from the cable clamps, the deformable sealing members extending outwardly from the outer base sections 18 and 19 and the deformable sealing members extending outwardly from the cover 240 may be suitably injection molded over such cable clamps, outer base section and cover by an injection molding process known in the art as overmolding. The over-molding process, as is known, bonds such sealing members to the underlying cable clamps, base section outer sections and cover 240. Such sealing members may be made, for example, from TPE-thermoplastic elastomer available under the trademark SARLINK® from DSM Engineering Plastics Inc. of Leominster, Mass. Cover 120 (FIG. 11) may be injection molded from clear polycarbonate.

It will be understood that the spaces between the various mating surfaces shown in various of the FIGS., e.g. FIGS. 14B, 14C, 15 and 16, have been exaggerated for clarity and ease of presentation.

It will be understood that many variations and modifications may be made in the present invention without departing from the spirit and the scope thereof.

What is claimed is:

1. Optical fiber closure apparatus, comprising:

first means and a plurality of optical fiber cable clamps providing cooperatively with said first means a plurality of optical fiber cable entry ports into said apparatus, each of said clamps provided with first sealing means and upon said clamps being forced into engagement with said first means and with optical fiber cables residing in said ports, said first sealing means sealingly engaging said cables and said first means and providing a fluid-tight seal between said clamps, said first means and said cables to prevent the entry of fluid into said apparatus between said clamps, said first means and said cables; and second means provided with second sealing means, said second means for being mounted to said first means to cause said second sealing means to sealingly engage said first means and provide a fluid-tight seal around said clamps to prevent the entry of fluid into said apparatus between said second means and said clamps.

2. Apparatus according to claim 1 wherein said first means comprise base means providing compartment means for receiving splices between optical fibers of a through cable entering and exiting a pair of said cable ports and the optical fibers of a drop cable entering one of said cable ports.

3. The apparatus according to claim 2 wherein said second means comprise a cover mounted pivotally to said base means and wherein said second sealing means are provided on said cover.

4. The apparatus according to claim 1 wherein said first means comprise the center section of a cylindrical base and wherein said second means comprise a pair of generally semi-cylindrical side sections mountable to said center section and wherein said second sealing means are provided on said side sections.

5. The apparatus according to claim 4 wherein said center and side sections comprise a cylindrical base and wherein said apparatus further includes substantially flat frame means extending outwardly from said base and a generally cylindrical cover having an open end and a domed closed end opposite said open end.

6. The apparatus according to claim 5 wherein said frame means is provided with opposite sides, one of said sides providing a compartment for receiving and storing optical fibers of said through cable and wherein the other side of said frame includes mounting means, and wherein said apparatus further includes a plurality of optical fiber splice trays mountable to said frame by said mounting means and wherein said optical fiber splice trays receive and organize said splices between said optical fibers of said through cable and said optical fibers of said drop cable.

7. The apparatus according to claim 1 wherein said first sealing means comprise at least one outwardly extending deformable sealing member provided on each of said clamps and a plurality of grooves provided on said first means adjacent said cable entry ports for receiving predetermined portions of said sealing members, said grooves having a first volume, a first length and a depth, and said predetermined portions of said sealing members having a second volume smaller than said first volume, a second length longer than said first length and a height greater than said depth whereby upon said cable clamps being forced into engagement with said first means and said optical fiber cables said predetermined portions of sealing members are compressed into said grooves and deformed to provide said fluid-tight seal between said first means, said clamps and said cables.

8. The apparatus according to claim 1 wherein said second sealing means comprise a groove formed in said second means having a first volume and a depth and an outwardly extending deformable sealing member mounted in said groove and having a second volume smaller than said first volume and a height greater than said depth whereby upon said second means being mounted to said first means said outwardly extending deformable sealing member is compressed and deformed into said groove to provide said fluid-tight seal between said first and said second means.

9. Optical fiber closure apparatus, comprising:

enclosure means for housing optical fibers and splices therebetween;

said enclosure means including at least a pair of mating surfaces, one of said surfaces provided with a groove having a first volume and a depth;

a deformable sealing member mounted in said groove, said sealing member having a second volume smaller than said first volume and a length greater than said depth; and force applying means for forcing said pair of surfaces substantially together to cause said sealing member to sealingly engage said second surface and to compress longitudinally inwardly and deform into and bulge outwardly in said groove and provide a substantially fluid-tight seal between said surfaces.

10. The apparatus according to claim 9 wherein said enclosure means includes a base and a cover for being fastened to said base, wherein said pair of mating surfaces are provided respectively on said base and cover and wherein said groove and said sealing member are provided on the mating surface of said cover.

11. The apparatus according to claim 10 wherein said enclosure means provides a first plurality of semi-circular grooves and wherein said apparatus further comprises a plurality of cable clamps equal in number to said first plurality of semi-circular grooves, said cable clamps providing a second plurality of semi-circular grooves and said first and second pluralities of semi-circular grooves cooperatively providing said apparatus with a plurality of optical fiber cable entry and exit cable ports, said enclosure means providing at least one clamp sealing member receiving groove adjacent each of said semi-circular grooves of said first plurality and each of said cable clamps provided with at least one outwardly extending clamp deformable sealing member including a predetermined portion for being received in one of said clamp sealing member receiving grooves, said clamp sealing member receiving grooves having a first volume, a first length and a depth and said predetermined portion of said clamp sealing members having a second volume smaller than said first volume, a second length longer than said first length and a height greater than said depth, and wherein said cable clamps are mounted to said enclosure means to force said cable clamps around optical fiber cables received in said cable ports and to force said predetermined portions of said clamp sealing members into said clamp sealing member receiving grooves to deform said predetermined portions of said clamp sealing members and provide fluid-tight seals around said optical fiber cables and between said predetermined portions of said clamp sealing members and said enclosure means.

12. The apparatus according to claim 11 wherein said apparatus includes a plurality of cable clamps, and wherein said enclosure means includes a generally cylindrical base, a generally flat support frame extending generally outwardly from said base and a generally cylindrical cover for being placed over said frame and base and fastened to said base, said frame including a pair of opposed generally flat support surfaces;

said cylindrical base including a central section including a pair of opposed cylindrical portions and a pair of generally semi-cylindrical outer sections for being assembled to and disassembled from said central section;

said cable clamps and said central section cooperatively providing two pluralities of said cable ports disposed in two parallel rows, one of said pluralities of cable ports extending generally parallel to one of said generally flat surfaces of said support frame and the other of said plurality of cable ports extending generally parallel to the other surface of said generally flat support frame, one of said surfaces of said support frame providing a compartment for storing optical fibers of a through or express optical fiber cable entering and exiting a pair of said cable ports of one of said pluralities of cable ports and the other surface of said support frame providing mounting means for mounting at least one optical fiber splice tray for organizing and storing splices between one or more optical fibers of said through or express optical fiber cable and one or more optical fibers of one or more drop optical fiber cables entering one or more cable ports of said other plurality of cable ports, and wherein said enclosure means includes two pairs of said mating surfaces, one mating surface of each of said pairs of mating surfaces provided on said central section and the other mating surface of each of said pairs of mating surfaces provided on one of said outer sections, wherein said groove and said sealing member are provided on the mating surfaces of each of said outer sections of said base.

13. The apparatus according to claim 12 wherein said cover is open at one end and terminates in a dome at the other end, said cover for being placed first over said support frame and then over said cylindrical base, and said apparatus further comprising cover clamping means for clamping said cover against said base in a fluid tight-seal.

14. The apparatus according to claim 10 wherein said base and cover are generally rectangular.

15. The apparatus according to claim 9 wherein said enclosure means includes at least two pairs of said mating surfaces, wherein said enclosure means includes a base and a cover for being fastened to said base, wherein said base is generally cylindrical and includes a central section and a pair of generally semi-cylindrical outer sections for being assembled to and disassembled from said central section, wherein said pairs of mating surfaces are provided on said central section and said outer sections and wherein said groove and said deformable sealing member are provided on the mating surface of each of said outer sections.

16. Optical fiber closure apparatus, comprising:

base means, a support frame extending outwardly from said base means, a plurality of cable clamps and cover means;

said base means including a central section and outer sections for being assembled to and disassembled from said central section, said central section and said cable clamps cooperatively providing a plurality of cable ports permitting optical fiber cables to enter and exit said apparatus, said cable clamps providing a fluid-tight seal around said cables in combination with said central section, and said outer sections upon assembly to said central section providing fluid-tight sealing around said cable clamps;

said support frame providing a compartment for storing optical fibers of an express or through optical fiber cable entering and exiting a pair of said cable ports and said support frame providing mounting means for mounting at least one optical fiber splice tray to said frame for storing and organizing splices between one or more optical fibers of one or more optical fiber cables; and said cover means including cover clamping means and comprising a hollow cover having an open end and terminating in a dome at the opposed end, said cover for sliding over said support frame and then over and around said base means and said cover clamping means for clamping a peripheral portion of said cover adjacent said open end in fluid-tight sealing engagement with said base means.

17. The apparatus according to claim 16 wherein said support frame is generally flat and has opposed surfaces, one of said surfaces providing said compartment for storing optical fibers and the other of said surfaces providing said mounting means for mounting said at least one optical fiber splice tray, and wherein said base means and said plurality of cable clamps provide said plurality of cable ports in two rows of generally parallel cable ports, each of said rows of cable clamps disposed generally parallel to one of said surfaces of said support frame.

18. Optical fiber closure apparatus, comprising:

enclosure means for containing splices between optical fibers of optical fiber cables;

a plurality of individual first sealing means;

each of said individual first sealing means for being associated with and sealingly engaging one of said cables to provide a plurality of individual first seals between said individual first sealing means and their associated cables to prevent the entry of fluid into said enclosure means between said plurality of individual first sealing means and said cables; and each individual first sealing means capable of being sealingly disengaged from its associated cable without interrupting the sealing engagement between the other individual first sealing means and their associated cables.

19. The apparatus according to claim 18 wherein said apparatus further comprises second sealing means for providing a fluid-tight seal around said plurality of individual first sealing means to prevent the entry of fluid into said enclosure means between said plurality of individual first sealing means and said enclosure means.

* * * * *